(12) United States Patent
Suzuki et al.

(10) Patent No.: US 6,537,699 B1
(45) Date of Patent: Mar. 25, 2003

(54) POSITIVE ELECTRODE PLATE FOR NICKEL-HYDROGEN CELL

(75) Inventors: Hiroyuki Suzuki, Wako (JP); Kyoichi Ariga, Wako (JP); Kunikazu Nagai, Koga (JP)

(73) Assignees: Honda Giken Kogyo Kabushiki Kaisha, Tokyo-To (JP); Sanoh Kogyo Kabushiki Kaisha, Koga (JP)

( * ) Notice: Subject to any disclaimer, the term of this patent is extended or adjusted under 35 U.S.C. 154(b) by 0 days.

(21) Appl. No.: 09/621,761

(22) Filed: Jul. 21, 2000

(30) Foreign Application Priority Data

Jul. 22, 1999 (JP) .............................. 11-207565

(51) Int. Cl.[7] .................................. H01M 4/24
(52) U.S. Cl. ...................... 429/223; 429/122
(58) Field of Search ....................... 429/223, 122, 429/121, 127, 162

(56) References Cited

U.S. PATENT DOCUMENTS

| | | | | |
|---|---|---|---|---|
| 4,957,543 A | * | 9/1990 | Babjak et al. ............... | 148/525 |
| 5,571,636 A | * | 11/1996 | Ohta et al. ................... | 429/218 |
| 5,674,643 A | * | 10/1997 | Yano et al. ................... | 429/223 |
| 5,759,718 A | * | 6/1998 | Yao et al. ..................... | 429/233 |
| 5,948,564 A | * | 9/1999 | Ovshinsky et al. .......... | 429/223 |
| 6,040,087 A | * | 3/2000 | Kawakami ................ | 429/218.1 |
| 6,258,483 B1 | * | 7/2001 | Abe ............................ | 429/223 |

FOREIGN PATENT DOCUMENTS

| | | |
|---|---|---|
| DE | 3005725 | 8/1981 |
| EP | 0626733 | 11/1994 |
| EP | 0764489 | 3/1997 |
| EP | 0827224 | 3/1998 |

* cited by examiner

Primary Examiner—Patrick Ryan
Assistant Examiner—M. Wills
(74) Attorney, Agent, or Firm—Ladas & Parry

(57) ABSTRACT

The positive electrode plate is a plate material which is formed by filling a foaming nickel substrate with a paste-like kneaded substance containing nickel hydroxide, and drying and pressure forming the substrate. The foaming nickel substrate is prepared by removing a plate foaming core material of urethane foam or the like after nickel-plating the foaming core material. First, the mass per unit area of nickel in the foaming nickel substrate is set to be 0.5 kg/m$^2$ or more, so that the ohmic resistance of the foaming nickel substrate can be lower than those of conventional foaming nickel substrates. In addition, the upper limit of the mass per unit area of nickel in the foaming nickel substrate is set to be 1.1 kg/m$^2$, so that it is possible to prevent the reduction of the energy density from exceeding the effect of the reduction of the ohmic resistance of the foaming nickel substrate.

6 Claims, 4 Drawing Sheets

POSITIVE ELECTRODE PLATE FOR NICKEL-HYDROGEN CELL

BACKGROUND OF THE INVENTION

1. Field of the Invention

The present invention relates generally to a positive electrode plate for a nickel-hydrogen cell wherein a foaming nickel substrate is filled with a paste-like kneaded substance containing nickel hydroxide as a principal component. More specifically, the invention relates to an improvement in the reduction of the ohmic resistance of the positive electrode plate.

2. Description of the Related Art

FIG. 7 shows the internal structure of an enclosed type nickel metal hydride (Ni MH) cell as a typical nickel-hydrogen cell, to which the present invention is applied. The enclosed type nickel metal hydride cell shown in FIG. 7 has a cylindrical container 4. This container 4 houses therein a positive electrode plate 5, a negative electrode plate 6, and a separator 7, which are cylindrically wound. In addition, the container 4 is filled with a predetermined electrolyte.

The positive electrode plate 5 is formed of a plate material which is formed by filling a foaming nickel substrate 1 with a paste-like kneaded substance containing nickel hydroxide as a principal component and pressure forming the resulting substrate after drying. This plate material is cut so as to have a predetermined dimension, and the cut material (together with the negative electrode 6 and the separator 7) is cylindrically wound to form the positive electrode plate 5.

The foaming nickel substrate 1 constituting the positive electrode plate 5 is prepared by removing a plate foaming core material 2 of urethane foam or the like after nickel-plating the foaming core material 2 while tension is applied to the foaming core material 2 in specific direction.

From the point of view of an improvement in the energy density of the nickel-hydrogen cell, it is required to reduce the weight ratio (increase the porosity rate) of the foaming nickel substrate 1 to the positive electrode plate. For that reason, the mass per unit area of nickel in the foaming nickel substrate 1 of the conventional positive electrode plate 5 is limited to about 0.35 to 0.5 kg/m².

However, in the above described conventional positive electrode plate for a nickel-hydrogen cell, there is a problem in that the ohmic resistance of the positive electrode plate is too great from the point of view of an improvement in discharge characteristics, although it is suited to improve the energy density of the nickel-hydrogen cell.

In addition, recent positive electrode plates themselves are harder with the densification of positive electrode plates, so that winding cracks are easily caused in the positive electrode plate when it is cylindrically wound. Then, the winding cracks in the positive electrode plate progress due to the expansion and contraction of the positive electrode plate caused by subsequent charge and discharge cycles, so that the ohmic resistance of the positive electrode plate is increased to deteriorate the discharge characteristics of the nickel-hydrogen cell.

SUMMARY OF THE INVENTION

It is therefore an object of the present invention to eliminate the aforementioned problems and to provide a positive electrode plate capable of having a lower ohmic resistance than those of conventional positive electrode plates, so as to reduce the internal resistance of a nickel-hydrogen cell using the positive electrode to improve the discharge characteristics thereof.

In order to accomplish the aforementioned and other objects, according to one aspect of the present invention, there is provided a positive electrode plate for a nickel-hydrogen cell, the positive electrode plate comprising: a foaming nickel substrate formed by removing a plate foaming core material after nickel-plating the foaming core material; and a kneaded substance containing nickel hydroxide as a principal component, the kneaded substance being filled in the foaming nickel substrate, wherein the foaming nickel substrate having a mass per unit area of nickel of 0.5 to 1.1 kg/m².

According to this positive electrode plate, the ohmic resistance of the foaming nickel substrate can be lower than those of conventional foaming nickel substrates by setting the mass per unit area of nickel in the foaming nickel substrate to be 0.5 kg/m² or higher.

On the other hand, if the mass per unit area of nickel in the foaming nickel substrate is too great, the energy density of the nickel-hydrogen cell is remarkably decreased due to the increase of the weight ratio of the foaming nickel substrate to the positive electrode plate. In addition, if the mass per unit area of nickel exceeds a certain extent, the reduction of the ohmic resistance of the foaming nickel substrate is not so great.

Therefore, in the positive electrode plate according this aspect of the present invention, the upper limit of the mass per unit area of nickel in the foaming nickel substrate is set to be 1.1 kg/m² to prevent the reduction of the energy density from exceeding the effect of the reduction of the ohmic resistance of the foaming nickel substrate.

According to another aspect of the present invention, there is provided a positive electrode plate for a nickel-hydrogen cell, the positive electrode plate being formed of a plate material comprising: a foaming nickel substrate formed by removing a plate foaming core material after nickel-plating the foaming core material while tension is applied to the foaming core material in specific direction; and a kneaded substance containing nickel hydroxide as a principal component, the kneaded substance being filled in the foaming nickel substrate, wherein the plate material is cut so as to have a predetermined dimension, and cylindrically wound in a winding direction which is substantially perpendicular to the direction of tension applied to the foaming core material.

According to this positive electrode plate, the elongation percentage of the foaming nickel substrate in direction substantially perpendicular to tensile direction applied to the foaming core material is greater than that in the tensile direction. Therefore, by causing the former direction to be coincident with the winding direction of the positive electrode plate, the flexibility of the positive electrode plate with respect to the winding can be maximum to prevent winding cracks from being caused in the positive electrode plate.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 4 is a illustration for explaining the second preferred embodiment of a positive electrode plate for a nickel-hydrogen cell, wherein FIG. 4(a) is a schematic view showing a porous structure of a foaming nickel substrate, and FIG. 4(b) is a schematic diagram showing directions of pores for the foaming nickel substrate;

As described above, according to the present invention, it is possible to reduce the internal resistance of a nickel-hydrogen cell using the positive electrode plate to improve the discharge characteristics of the nickel-hydrogen cell.

DESCRIPTION OF THE PREFERRED EMBODIMENTS

Referring now to the accompanying drawings, the preferred embodiments of the present invention will be described below. FIGS. 1 through 6 show the preferred embodiments of a positive electrode plate for a nickel-hydrogen cell according to the present invention. Furthermore, in the preferred embodiments shown in FIGS. 1 through 6, the same reference numbers as those in a typical nickel-hydrogen cell shown in FIG. 7 are given to the same elements as those in the typical nickel-hydrogen cell, and the descriptions thereof will be described suitably referring to FIG. 7.

First Preferred Embodiment

First, referring to FIGS. 1, 2 and 7, the first preferred embodiment of the present invention will be described. First, referring to FIG. 7, the internal structure of an enclosed type nickel metal hydride (Ni MH) cell serving as a typical nickel-hydrogen cell, to which the present invention is applied, will be described.

Figure 7:
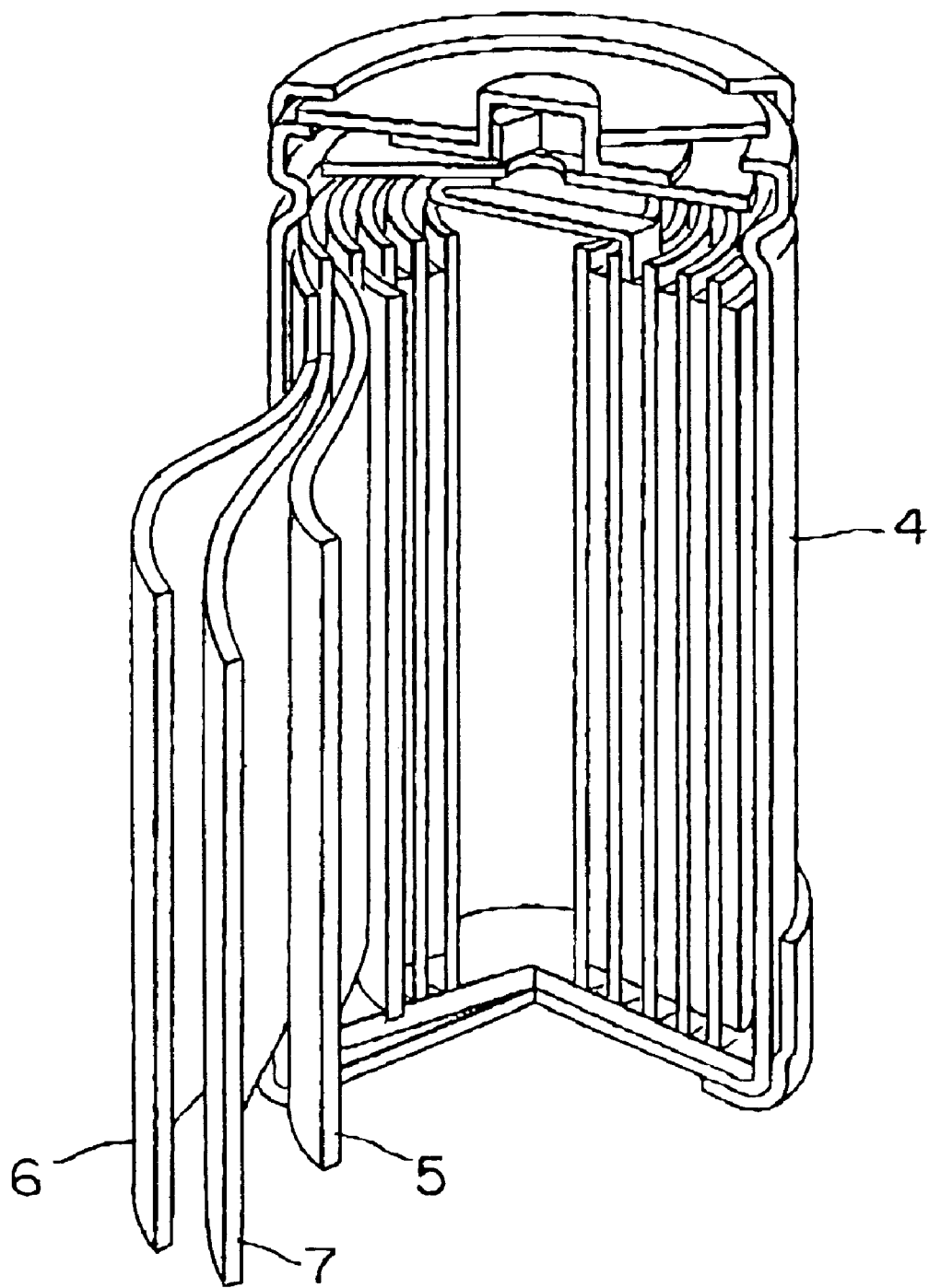
FIG. 7 is a partially-expanded sectional perspective view of an enclosed type nickel metal hydride cell serving as a typical nickel-hydrogen cell, to which the present invention is applied.

The encapsulate type nickel metal hydride cell shown in FIG. 7 has a cylindrical steel container 4. This container 4 houses therein a positive electrode plate (a paste type nickel electrode) 5, a negative electrode plate (a hydrogen absorbing alloy electrode) 6, and a separator 7, which are cylindrically wound. In addition, the container 4 is filled with a predetermined electrolyte.

The positive electrode plate 5 is formed of a plate material which is formed by filling a foaming nickel substrate 1 with a paste-like kneaded substance containing nickel hydroxide as a principal component and pressure forming the resulting substrate after drying. This plate material includes a binder, a conductive assistant and cobalt additive in addition to nickel hydroxide. Then, the plate material is cut so as to have a predetermined dimension, and the cut material (together with the negative electrode 6 and the separator 7) is cylindrically wound to form the positive electrode plate 5.

Figure 3:
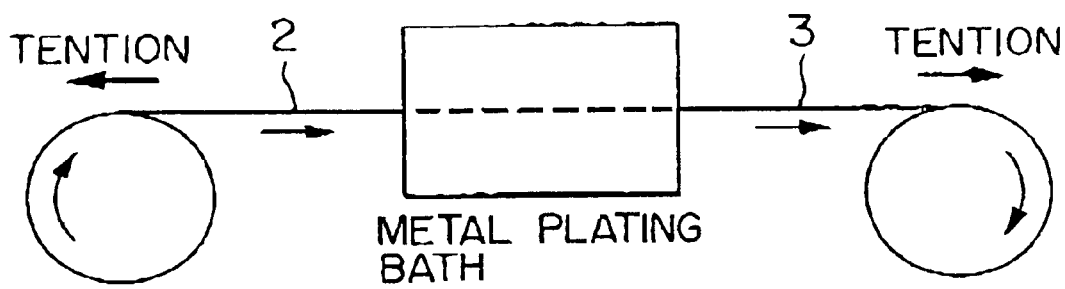
FIG. 3 is a schematic diagram showing a process for producing a foaming nickel substrate of a positive electrode plate for a nickel-hydrogen cell.

The foaming nickel substrate 1 constituting the positive electrode plate 5 is prepared by removing a plate foaming core material 2 of urethane foam or the like by oxidation or burning after nickel-plating the foaming core material 2 (as shown by reference number 3 in FIG. 3) while tension is applied to the foaming core material 2 in specific direction as illustrated in FIG. 3.

Figure 1:
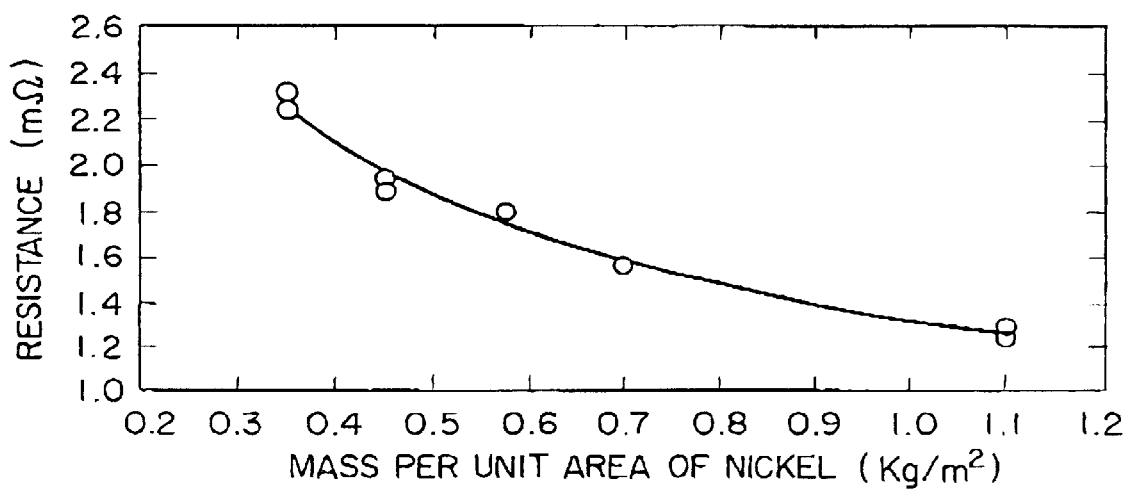
FIG. 1 is a graph showing the test results of the examination into the relationship between a mass per unit area of nickel and resistance value of a foaming nickel substrate, for explaining the first preferred embodiment of a positive electrode plate for a nickel-hydrogen cell according to the present invention.
Figure 2:
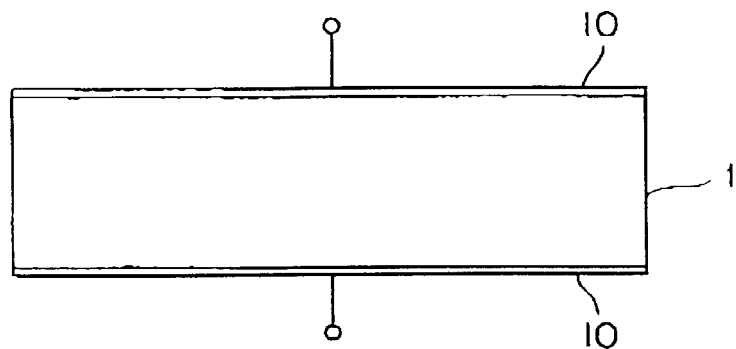
FIG. 2 is a schematic diagram showing test conditions with respect to the test results shown in FIG. 1.

The test results of the examination into the relationship between a mass per unit area of nickel and resistance value of the foaming nickel substrate 1 are shown in the graph of FIG. 1. In this test, a plurality of foaming nickel substrates 1 (length: 250 mm, width: 30 mm, thickness: 1.2 mm) having different mass per unit areas were prepared as test pieces as shown in FIG. 2. Test electrodes 10 were stuck on both cross-direction end surfaces of each of the foaming nickel substrates 1 to measure a resistance value between the electrodes 10 by means of a low resistance-measuring instrument.

According to the test results shown in FIG. 1, although the resistance value of the foaming nickel substrate decreases as the mass per unit area of nickel increases, the rate of reduction of the resistance value also decreases as the mass per unit area increases. On the basis of such test results, the mass per unit area of nickel in the foaming nickel substrate 1 is in the range of 0.5 to 1.1 $kg/m^2$, preferably in the range of 0.65 to 0.75 $kg/m^2$, in this preferred embodiment.

With such a construction, the effects in this preferred embodiment will be described. According to this preferred embodiment, if the mass per unit area of nickel in the foaming nickel substrate 1 is 0.5 $kg/m^2$ or higher, preferably 0.65 $kg/m^2$ or higher, the ohmic resistance of the foaming nickel substrate 1 can be lower than those of conventional foaming nickel substrates. In addition, if the ohmic resistance of the foaming nickel substrate 1 constituting the positive electrode plate is low, it is possible to reduce the internal resistance of a nickel-hydrogen cell using the positive electrode plate to improve the discharge characteristics of the nickel-hydrogen cell.

On the other hand, if the mass per unit area of nickel in the foaming nickel substrate 1 is too great, the energy density of the nickel-hydrogen cell is remarkably decreased due to the increase of the weight ratio (the decrease of the porosity rate) of the foaming nickel substrate 1 to the positive electrode plate. In addition, as shown in FIG. 1, if the mass per unit area of nickel exceeds a certain extent, the reduction of the ohmic resistance of the foaming nickel substrate 1 is not so great.

Therefore, in this preferred embodiment, the upper limit of the mass per unit area of nickel in the foaming nickel substrate 1 is set to be 1.1 $kg/m^2$, preferably 0.75 $kg/m^2$, to prevent the reduction of the energy density from exceeding the effect of the reduction of the ohmic resistance of the foaming nickel substrate 1.

Second Preferred Embodiment

Figure 4:
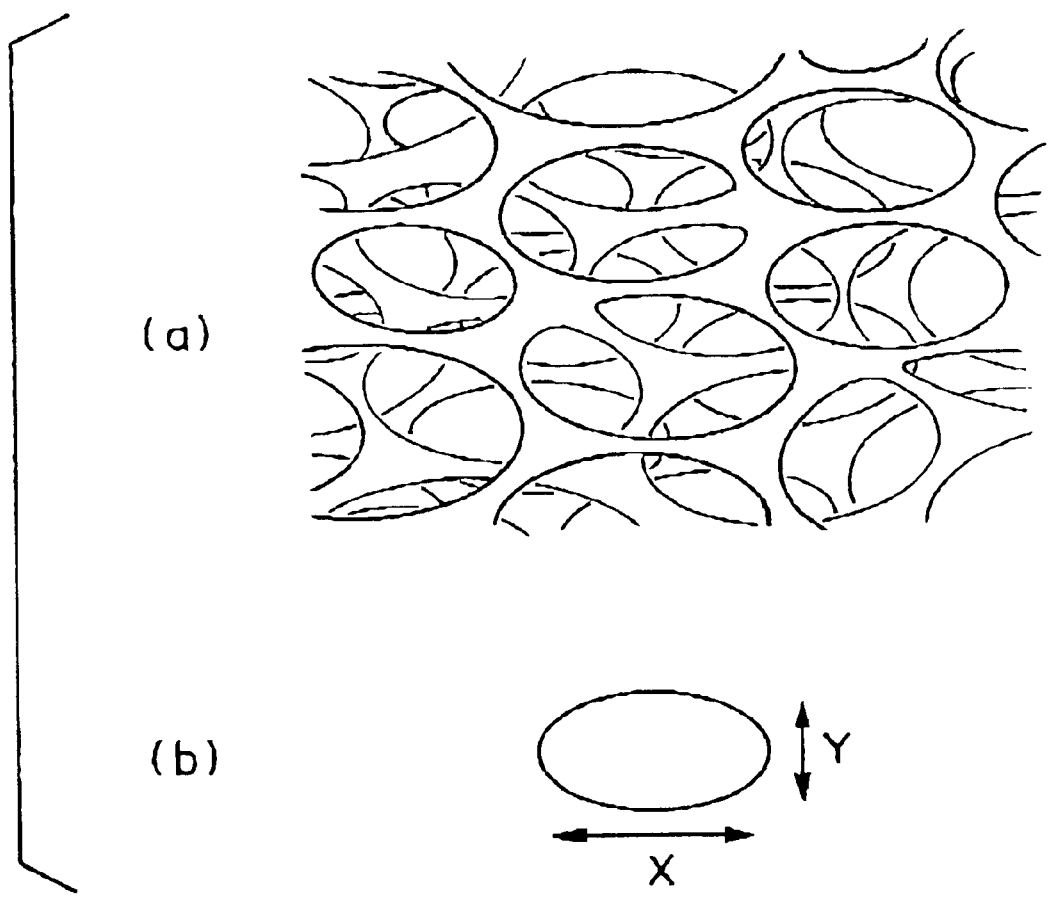
Figure 5:
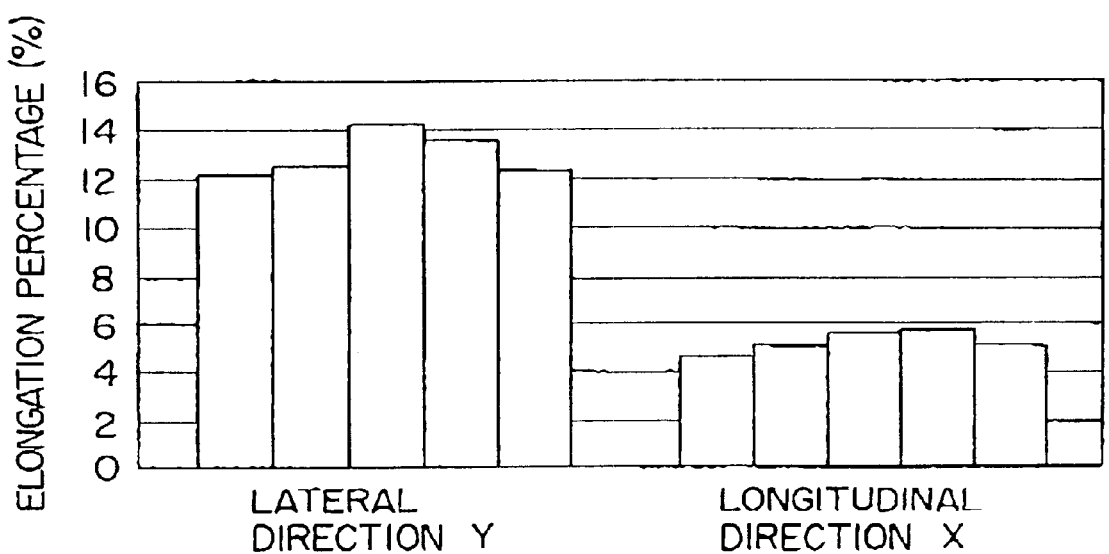
FIG. 5 is a graph showing the test results of the examination into the relationship between the directions of pores and elongation percentage of a foaming nickel substrate for explaining the second preferred embodiment of a positive electrode plate for a nickel-hydrogen cell according to the present invention.
Figure 6:
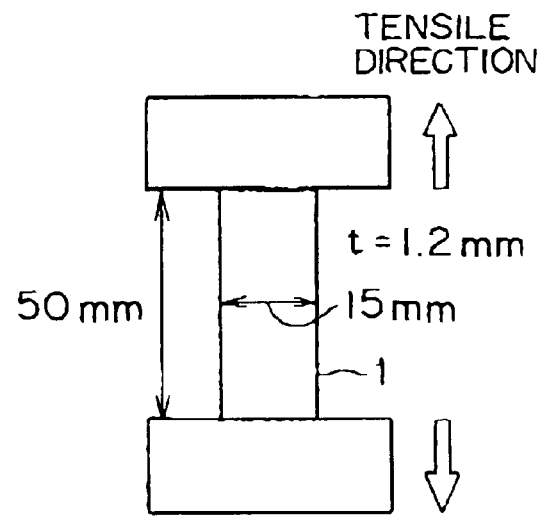
FIG. 6 is a schematic diagram showing test conditions with respect to the test results shown in FIG. 5.

Referring to FIGS. 4 through 6, the second preferred embodiment of the present invention will be described below. First, referring to FIG. 4, the porous structure of the foaming nickel substrate 1 will be described. As described above, the foaming nickel substrate 1 is prepared by removing the plate foaming core material 2 of urethane foam or the like by oxidation or burning after nickel-plating the foaming core material 2 while tension is applied to the foaming core material 2 in a specific direction (see FIG. 3). Therefore, the foaming nickel substrate 1 has a porous structure having a uniform directional property as shown in FIG. 4(a).

That is, as shown in FIG. 4(b), the foaming nickel substrate 1 has a porous structure which is more greatly stretched in a longitudinal direction X of pores corresponding to the tensile direction of the foaming core material 2 than that in a lateral direction Y of pores corresponding to direction perpendicular to the tensile direction.

The test results of the examination into the difference between the elongation percentages in the lateral direction Y and longitudinal direction X of pores are shown in the graph of FIG. 5. In this test, foaming nickel substrates 1 (tensile direction length: 50 mm, width: 15 mm, thickness: 1.2 mm) having different direction in each of the lateral direction Y and longitudinal direction X of pores were prepared as test pieces as shown in FIG. 6 to carry out tension tests (load: 5 to 7 kg) to examine the elongation percentages of the respective test pieces. In this case, assuming that the initial length of the test piece is L (=50 mm) and the length of the test piece after the tensile test is L', the elongation percentage is defined by ((L'–L)×100 (%).

According to the test results shown in FIG. 5, it can bee seen that the elongation percentage (about 12 to 14%) of the foaming nickel substrate 1 in the lateral direction Y is double or more that (about 5 to 6%) in the longitudinal direction X. On the basis of such test results, the cylindrical winding direction of the positive electrode plate 5 corresponds to the lateral direction Y of pores of the foaming nickel substrate 1 in this preferred embodiment.

Specifically, when the plate material is cut so as to have a predetermined dimension after the foaming nickel substrate 1 is filled with the paste-like kneaded substance to be dried and pressure formed to prepare the plate material, the plate material is cut so that the winding direction of the positive electrode plate 5 is coincident with the lateral direction Y of pores. For example, the plate material is cut so that the longitudinal direction of pores of the positive electrode plate 5 is coincident with the lateral direction Y of pores.

With such a construction, the effects in this preferred embodiment will be described. According to this preferred embodiment, the elongation percentage of the foaming nickel substrate 1 in the lateral direction Y of pores is greater than that in the longitudinal direction X of pores. Therefore, if the winding direction of the positive electrode plate 5 is coincident with the lateral direction Y of pores, the flexibility of the positive electrode plate 5 with respect to the winding can be maximum to prevent winding cracks from being caused in the positive electrode plate 5.

Therefore, it is possible to prevent the ohmic resistance of the positive electrode plate 5 from increasing due to the winding cracks, so that it is possible to reduce the internal resistance of a nickel-hydrogen cell using the positive electrode plate to improve the discharge characteristics of the nickel-hydrogen cell.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A positive electrode plate for a nickel-hydrogen cell, said positive electrode plate being formed of a plate material comprising:

a foamed nickel substrate formed by removing a plate foamed core material after nickel-plating the foamed core material while tension is applied to said foamed core material in a specific direction; and a kneaded substance containing nickel hydroxide as a principal component, said kneaded substance being filled in said foamed nickel substrate, wherein said plate material is cut so as to have a predetermined dimension, and cylindrically wound such that a direction of winding tension is substantially perpendicular to the direction of tension applied to said foamed core material.

2. The positive electrode plate according to claim 1, wherein said foamed nickel substrate has a maximum elongation percentage in a first direction and a minimum elongation percentage in a second direction, said maximum elongation percentage being at least twice said minimum elongation percentage.

3. The positive electrode plate according to claim 1, wherein said foamed core material has a porous structure having a directional property such that said porous structure is elongated in a specific direction.

4. A positive electrode plate for a nickel-hydrogen cell, said positive electrode plate being formed of a plate material comprising:

a foamed nickel substrate formed by removing a plate foamed core material after nickel-plating in the foamed core material; and a kneaded substance containing nickel hydroxide as a principal component, said kneaded substance being filled in said foamed nickel substrate, wherein said plate material is cut so as to have a predetermined dimension, and cylindrically wound in a winding direction substantially corresponding to a first direction in which said foamed nickel substrate has a maximum elongation percentage.

5. The positive electrode plate according to claim 4, wherein said foamed nickel substrate has a minimum elongation percentage in a second direction, said maximum elongation percentage being at least twice said minimum elongation percentage.

6. The positive electrode plate according to claim 4, wherein said foamed core material has a porous structure having a directional property such that said porous structure is elongated in a specific direction.

* * * * *